United States Patent
Dho

(10) Patent No.: US 6,796,689 B2
(45) Date of Patent: Sep. 28, 2004

(54) IMAGE PROJECTION APPARATUS AND METHOD

(75) Inventor: Sang-whoe Dho, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 10/283,268

(22) Filed: Oct. 30, 2002

(65) Prior Publication Data

US 2003/0107893 A1 Jun. 12, 2003

(30) Foreign Application Priority Data

Dec. 12, 2001 (KR) ........................... 2001-78491

(51) Int. Cl.[7] ............................................. F21V 21/14
(52) U.S. Cl. ........................................ 362/393; 353/122
(58) Field of Search ........................... 362/393; 353/122, 353/84, 85, 94, 99, 31

(56) References Cited

U.S. PATENT DOCUMENTS

| | | | | |
|---|---|---|---|---|
| 5,386,250 A | * | 1/1995 | Guerinot | 348/770 |
| 6,567,134 B1 | * | 5/2003 | Morgan | 348/743 |
| 6,621,529 B2 | * | 9/2003 | Ohara et al. | 348/743 |
| 6,631,993 B2 | * | 10/2003 | Fielding | 353/31 |
| 2001/0053078 A1 | * | 12/2001 | Ishikawa et al. | 362/238 |
| 2001/0055081 A1 | * | 12/2001 | Shigeta | 349/106 |
| 2002/0005829 A1 | * | 1/2002 | Ouchi | 345/88 |
| 2002/0044445 A1 | * | 4/2002 | Bohler et al. | 362/293 |
| 2003/0090597 A1 | * | 5/2003 | Katoh et al. | 348/744 |

* cited by examiner

Primary Examiner—Alan Cariaso
Assistant Examiner—Jacob Y. Choi
(74) Attorney, Agent, or Firm—Sughrue Mion, PLLC

(57) ABSTRACT

An image projection apparatus and method for amplifying a quantity of light includes a light source that irradiates a white light. A light amplifying unit amplifies the light quantity of a light having a certain wavelength of the white light, and the light amplifying unit outputs the amplified light. The light amplifying unit is formed of a fluorescent substance that lets the wavelength of the visible light band pass, while absorbing the other wavelengths. The light amplifying unit receives the external wavelength identical to the certain wavelength, thereby amplifying the certain wavelength. Accordingly, the light quantity of monochromatic light of the certain wavelength is amplified, improving the light utilization efficiency. Additionally, hue/saturation/brightness of the color is also improved by moving the intermediate wavelength of the certain wavelength within a predetermined range.

10 Claims, 4 Drawing Sheets

IMAGE PROJECTION APPARATUS AND METHOD

BACKGROUND OF THE INVENTION

1. Field of the Invention

The present invention generally relates to an image projection apparatus and method, and more particularly to an image projection apparatus and method for amplifying light quantity by using a fluorescent material. The present application is based on Korean Application No. 2001-78491, filed on Dec. 12, 2001, which is incorporated herein by reference.

2. Description of the Prior Art

Generally, display apparatuses such as projectors and projection systems display images by converting lights from a light source into image signals and projecting the converted signals to a screen. Electromagnetic waves such as radio waves and microwaves are generally used in the display apparatuses.

The electromagnetic waves include not only ultraviolet rays, visible rays and infrared rays, but also include electro waves, for transmitting signals through radios or TVs, and X-rays. The electromagnetic waves are characterized by frequency and wavelength.

Optics usually uses visible rays, and sometimes uses ultraviolet rays, infrared rays and X-rays.

Visible rays are perceptible by the human eye, and have a wavelength ranging from 400 nm (violet) through 700 nm (red). The visible rays vary in color according to their wavelength. For example, the monochromatic light is divided into red in the wavelength range of 610 nm through 700 nm, orange in 590 nm through 610 nm, yellow in 570 nm through 590 nm, green in 500 nm through 570 nm, blue in 450 nm through 500 nm, and purple in 400 nm through 450 nm.

Ultraviolet rays have a wavelength of 10 nm through 400 nm, and the infrared rays have a wavelength of 0.7 nm through 1 nm.

An object emits a light when exposed to an ultraviolet ray, X-ray or electron ray, and such a light emission is called a luminescence. Fluorescence and phosphorescence are types of luminescence. The fluorescence is visible rays of different colors reflected from a certain non-heated object in response to an external stimulus. The non-heated material is called a fluorescent material. The fluorescent material may be applied in a fluorescent lamp, neon and cathode-ray tube.

For example, the fluorescent lamp glows by using a fluorescent material and electricity. An electric field stimulates mercury and electron vapor by an electric discharge between two electrodes, thereby generating ultraviolet rays. The ultraviolet rays pass through the fluorescent material, and thus are converted to the visible rays perceptible by the human eye. As a result, the fluorescent lamp glows.

FIG. 1 is a view showing the basic structure of a conventional image projection apparatus using a color wheel, and FIG. 2 is a view showing the distribution of spectrum energy of the white light radiated from the conventional light source.

Referring to FIG. 1, the conventional image projection apparatus 100 using a color wheel includes a light source 110, a color wheel 120, a digital micromirror device (DMD) panel 130 and a projection lens 140. The phantom line in FIG. 1 indicates the light path of the white light.

The light source 110 irradiates white light by using an arc lamp or a laser beam. The color wheel 120 is rotated by a rotary means (in the arrowed direction), and is divided into red (R), green (G) and blue (B) regions. White light from the light source 110 is divided into RGB beams according to the RGB regions of the color wheel 120.

The DMD panel 130 includes a plurality of micromirrors 130a. RGB beams divided by the wavelengths are passed through the DMD panel 130 and reflected from the micromirrors 130a. After being reflected, each of the RGB beams passes through the projection lens 140 and is realized on the screen as an image.

The light source 110 used in the conventional image projection apparatus 100 uses white light that usually includes RGB beams. Referring to FIG. 2, the horizontal axis indicates the distribution of wavelengths, while the vertical axis indicates the distribution of spectrum energy. The white light includes visible rays (RGB beams) and ultraviolet (UV) rays.

While the visible rays are used in realizing images, the ultraviolet rays vanish. In the visible light that includes the RGB beams, the R and B beams, and more particularly the R beam, have a lesser light quantity when compared to the G beam.

Because the light quantity of the R beam is considerably lacking in the conventional image projection apparatus, the images formed on the screen usually have a deteriorated color purity and brightness. Further, as the ultraviolet rays vanish, the R beam remaining in the ultraviolet ray also vanishes.

SUMMARY OF THE INVENTION

Accordingly, it is an aspect of the present invention to provide an image projection apparatus and method capable of amplifying a light quantity of white light by fluorescing lights other than the visible rays irradiated from a light source.

The above aspect is accomplished by an image projection apparatus according to the present invention, including a light source for irradiating a white light; a light quantity amplifying unit for amplifying the light quantity of a ray of the white light having a certain wavelength, and outputting the amplified ray; a light separating unit for receiving the white light from the light quantity amplifying unit and separating the received light into plural monochromatic lights; and a digital micromirror device (DMD) panel for reflecting the monochromatic lights at a predetermined angle.

The light quantity amplifying unit is comprised of a fluorescent material that transforms the white light into light of a certain wavelength by letting the wavelength of the visible light band pass, while absorbing the other wavelengths. The light quantity amplifying unit moves an intermediate wavelength of the certain wavelength within a predetermined range.

The light separating unit is comprised of a rotatable wheel that is divided into red, green and blue regions, for separating the white light into the plural monochromatic lights. Further, a square beam generating unit is provided for transforming the monochromatic lights, received from the light separating unit, into a square beam.

Additionally, it is an aspect of the present invention to provide an image projection method for realizing an image by irradiating a white light. A light quantity of a ray of the white light having a certain wavelength is amplified, wherein the white light is separated into a plurality of monochromatic lights. The monochromatic lights being reflected at a predetermined angle, wherein a projected image is realized.

According to the present invention, it is possible to enhance the light utilization efficiency by amplifying the light quantity of the light, especially of the R or B band, which has the wavelength corresponding to that of the visible light band.

BRIEF DESCRIPTION OF THE DRAWINGS

The above-mentioned aspects and features of the present invention will be more readily apparent from the following description of the illustrative, non-limiting embodiments of the present invention and by reference to the appended drawings, in which.

DETAILED DESCRIPTION OF THE ILLUSTRATIVE, NON-LIMITING EMBODIMENTS

Hereinafter, the illustrative, non-limiting embodiments of the present invention will be described in greater detail with reference to the accompanying drawings.

Figure 3:
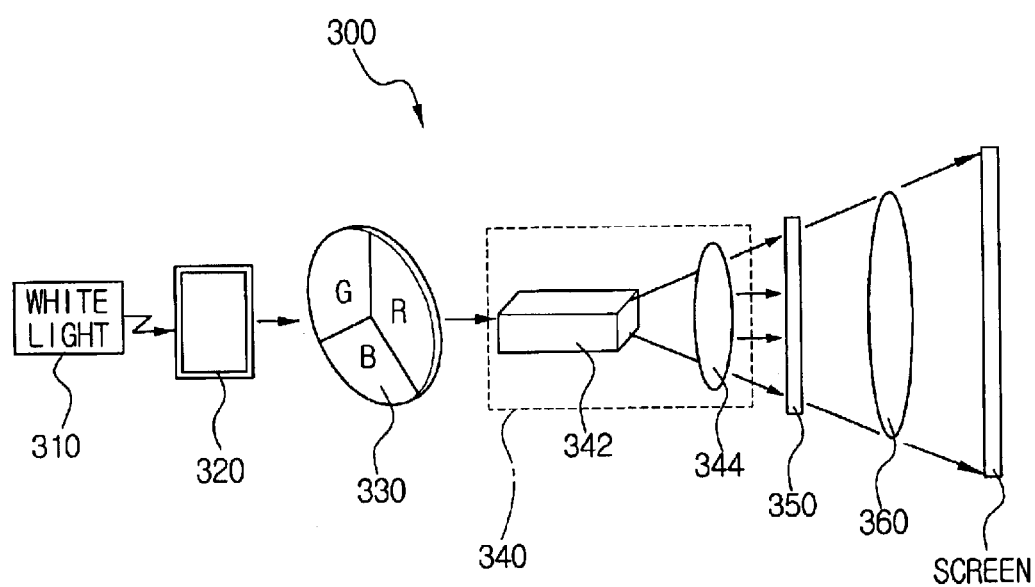
FIG. 3 is a view schematically showing an image projection apparatus according to an illustrative, non-limiting embodiment of the present invention.

Referring to FIG. 3, the image projection apparatus 300 according to the present invention includes a light source 310, a light quantity amplifying unit 320, a light separating unit 330, a square beam generating unit 340 and a DMD panel 350.

The light source 310 irradiates white light or a laser beam. The light source 310 can be formed, for example, of a laser, an arc lamp, a metal halide lamp, a halogen lamp or a xenon lamp.

Among the white light irradiated from the light source 310, the light quantity amplifying unit 320 amplifies the light quantity of a light having a particular wavelength and outputs the result. More specifically, the light quantity amplifying unit 320 lets the wavelength of visible rays pass, while absorbing the other wavelengths.

For example, ultraviolet rays and X-rays have wavelengths other than that of visible rays. The absorbed wavelengths are added to the baseband of the visible rays, resulting in an increase of the light quantity of the certain wavelength.

For the purpose of light quantity amplification, the light quantity amplifying unit 320 uses a fluorescent substance on which a fluorescent material is applied. The fluorescent material absorbs the light having a short wavelength, namely, ultraviolet rays or X-rays, thereby causing the visible rays to be irradiated. By the stimulation of radiation of the rays of light, the fluorescent material emits visible rays.

As for the fluorescent substance, various fluorescent materials such as an amino acid, an acridine, and a cyanine dye can be used. Depending on the characteristics of the fluorescent material being used, visible rays of different wavelengths can be produced. Accordingly, colorful lights can be produced by varying the fluorescent substance.

The light quantity amplifying unit 320 can include one or more fluorescent substances. In this case, the light quantity of lights of different wavelengths can be amplified by varying the fluorescent material applied on the fluorescent substance.

When the ultraviolet rays, absorbed in the fluorescent substance, are transformed to the wavelength of the R-band that requires light quantity amplification, the intermediate wavelength of the amplified R-band is movable toward the direction of better hue/saturation/brightness. The intermediate wavelength moves within the wavelength range of the R-band, approximately between 610 nm and 700 nm.

The above embodiment describes the light quantity amplifying unit 320 formed of a fluorescent substance coated with a fluorescent material.

According to another illustrative, non-limiting embodiment of the present invention, the light quantity amplifying unit 320 can have a selecting unit (not shown) and an amplifying unit (not shown).

From the incident white light, the selecting unit extracts a wavelength band that requires light quantity amplification, and selects the intermediate wavelength of the extracted wavelength band. The amplifying unit can either be supplied with, or produce the wavelength identical to the selected intermediate wavelength, to amplify the wavelength of the intermediate wavelength.

In the above embodiments, the light quantity amplifying unit 320 is formed of a simple structure. That is, as the light quantity amplifying unit 320 receives the external wavelength or produces the wavelength having the identical value as the wavelength selected by the selecting unit, the wavelength of light is amplified without having to replace the interior structure of the amplifying unit.

Figure 4:
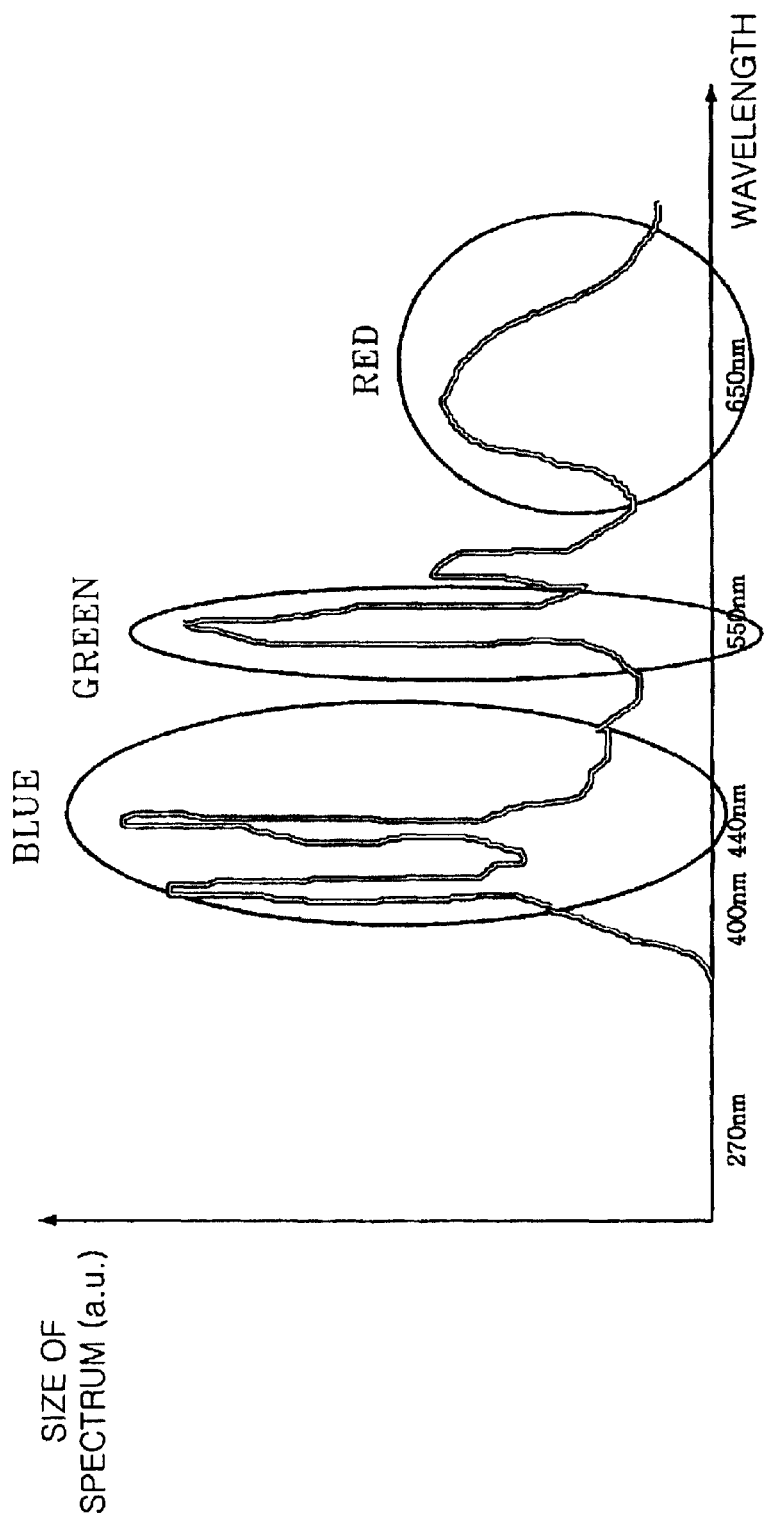
FIG. 4 is a view showing a spectrum energy distribution of the white light passed through a light quantity amplifying unit of FIG. 3.

As the light quantity of the monochromatic light is amplified with respect to the intermediate wavelength by use of the fluorescent substance or by reception of the supplied wavelength, the spectrum energy has the distribution as shown in FIG. 4. The white light including the amplified monochromatic light is then output to the light separating unit 330.

Referring to FIG. 4, the light quantity amplifying unit 320 uses a fluorescent substance producing R-monochromatic light. The visible rays band is mainly divided into red (R), green (G) and blue (B) regions. In FIG. 4, the horizontal axis refers to the distribution of wavelengths, and the vertical axis refers to the distribution of spectrum energy.

Figure 1:
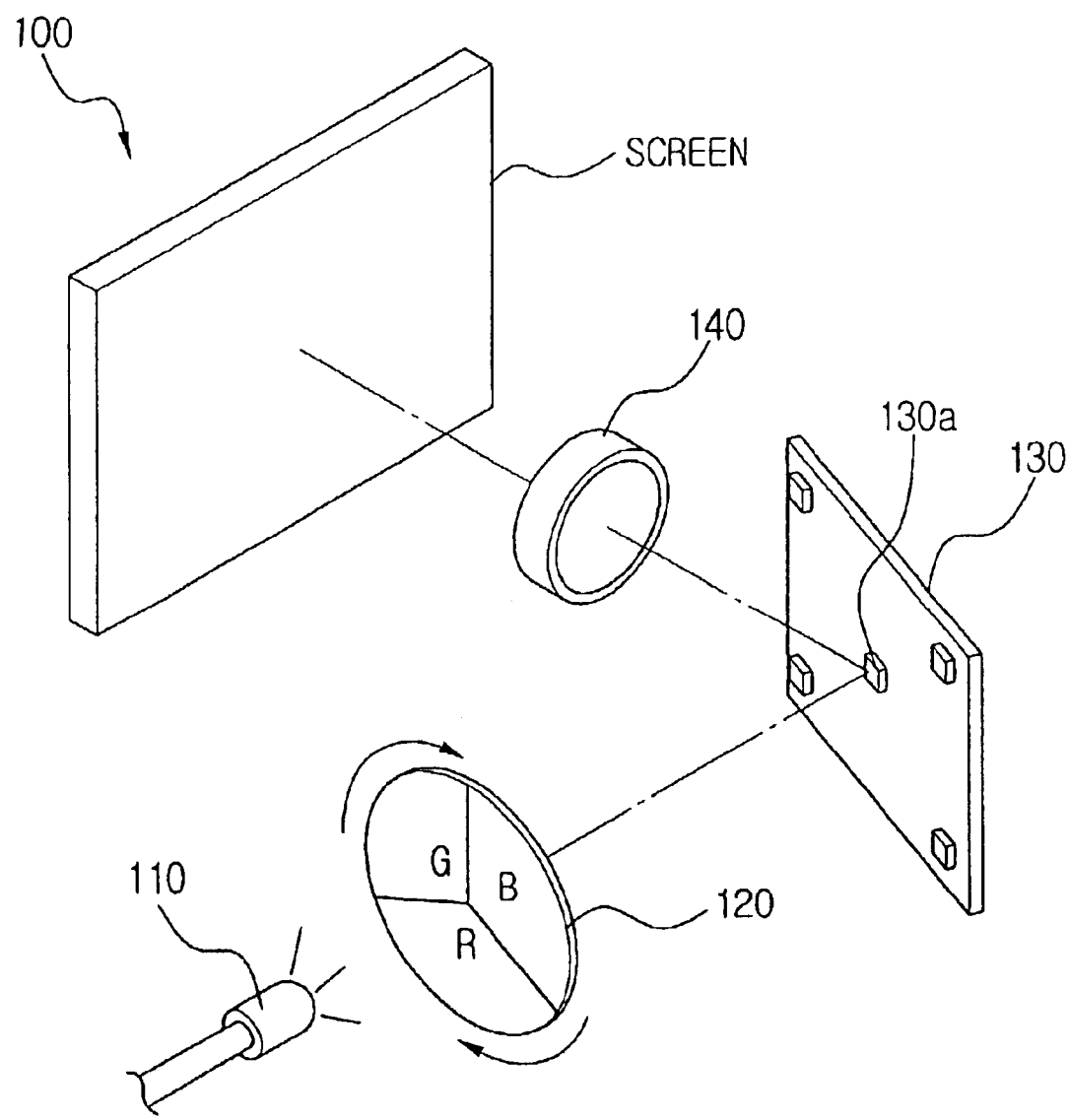
FIG. 1 is a view showing the basic structure of a conventional image projection apparatus using a color wheel.
Figure 2:
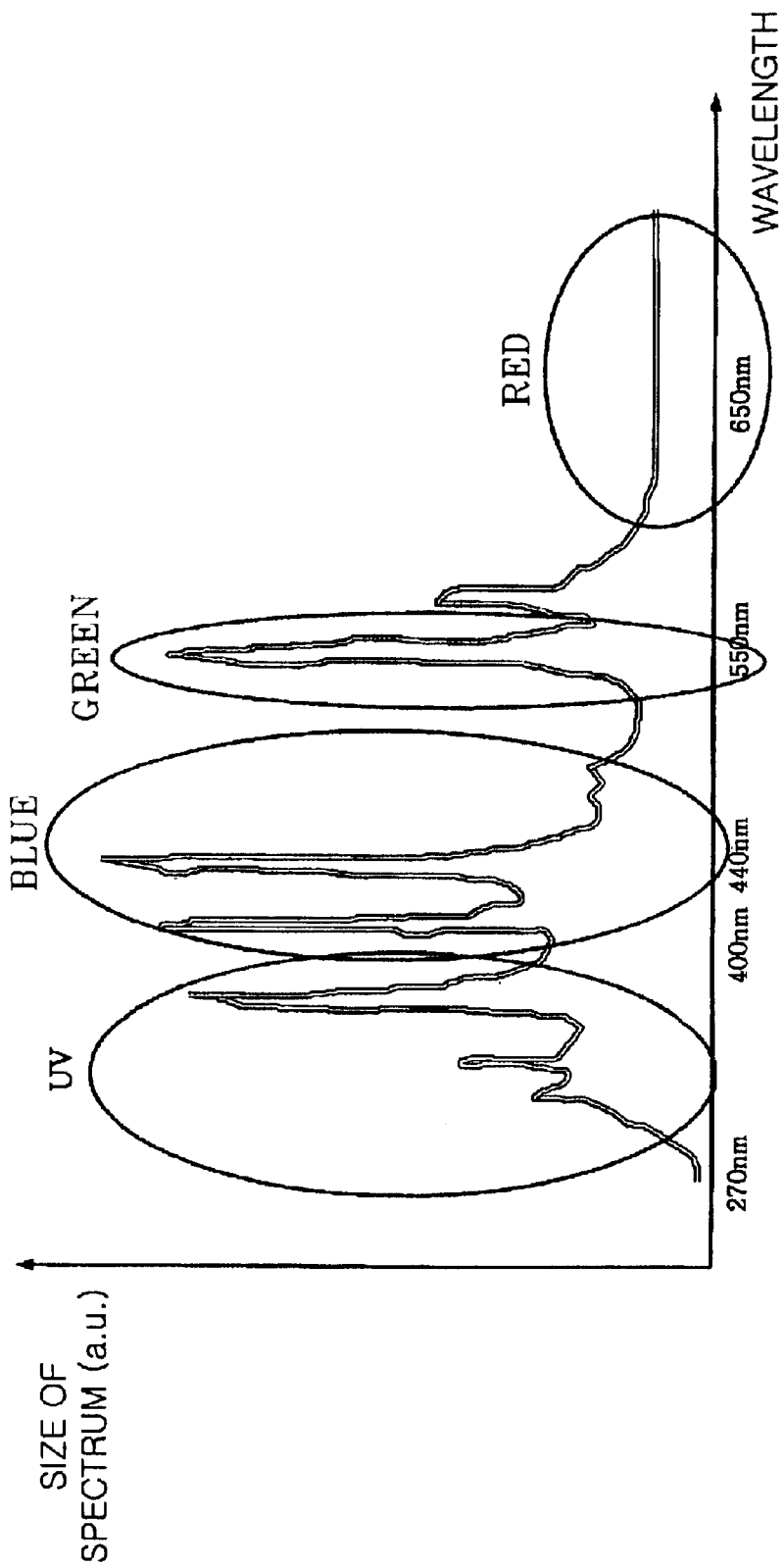
FIG. 2 is a view showing a spectrum energy distribution of the white light irradiated from a conventional light source.

Upon comparing the distribution of spectrum energy of FIG. 4 with that of FIG. 2, it is noted that the spectrum energy of the R-band is greatly increased while the ultraviolet rays of relatively low wavelengths have disappeared after the white light has passed through the light quantity amplifying unit 320. This is because the light quantity of the R-monochromatic light, which was relatively lacking, has been increased by the light quantity amplifying unit 320.

The light separating unit 330 receives the white light from the light quantity amplifying unit 320 and separates the amplified light into plural monochromatic lights. The light separating unit 330 can include, for example, a color wheel, a dichroic mirror, a hologram element, etc.

The illustrative, non-limiting embodiment referring to FIG. 3 uses a color wheel as the light separating unit 330. The color wheel 330 is rotated by a rotating device, and divided into red (R), green (G) and blue (B) regions. After being irradiated, the white light is passed through the color wheel 330, and divided into R, G and B beams.

The square beam generating unit 340 includes a light tube 342 and a lens 344. The light tube 342 is a hollow hexahedron. Four inner sides of the light tube 342 are formed of mirrors. Accordingly, the RGB beams are incident to the space inside of the light tube 342. The light tube 342 transforms the RGB beams into square beams.

The lens 344 outputs the square beam of RGB beams as parallel rays, onto the DMD panel 350. The DMD panel 350 modulates the RGB beams, and reflects the beams at a predetermined angle. The projection lens 360 forms an image by projecting the reflected RGB beams onto a screen sequentially.

The illustrative, non-limiting embodiment according to the present invention, as described above, depicted the image projection apparatus as amplifying the light quantity of monochromatic light by use of a monochromatic fluorescent material. In addition to using a monochromatic fluorescent material, it is also possible to use fluorescent materials corresponding to the RGB wavelength bands for amplifying the light quantity of the RGB beams.

With the image projection apparatus and method according to the present invention, a certain wavelength of the visible rays can be amplified by using a fluorescent material corresponding to the visible rays band, i.e., to the RGB wavelength bands. As a result, the light quantity of the monochromatic light of the particular wavelength is amplified.

More specifically, in the white light, lights such as ultraviolet rays and X-rays that are to vanish are changed to the particular wavelength of the visible rays band by the fluorescent substance, and then combined to form the visible rays. As a result, the rays quantity of the visible light increases, and the light utilization efficiency also increases. Also, as the light utilization efficiency increases, the color purity improves.

Further, the fluorescent substance absorbs lights other than the visible rays, which means the fluorescent substance lets the visible rays pass. Accordingly, the light path of the image projection apparatus can be simplified according to the present invention. Additionally, because the fluorescent substance is used, the intermediate wavelength of the monochromatic light that requires light quantity amplification becomes movable. As the intermediate wavelength is movable, the hue/saturation/brightness of the monochromatic light on screen can be improved.

Although illustrative, non-limiting embodiments of the present invention have been described, it will be understood by those skilled in the art that the present invention should not be limited to the described illustrative, non-limiting embodiments, but various changes and modifications can be made within the spirit and scope of the present invention as defined by the appended claims.

What is claimed is:

1. An image projection apparatus, comprising:
    a light source for irradiating a white light;
    a light quantity amplifying unit for transforming a light quantity of a ray of the white light within a non-visible band into a second light quantity within a visible band, combining the second light quantity with the ray of white light and outputting the amplified ray;
    a light separating unit for receiving the white light from the light quantity amplifying unit and for separating the received light into a plurality of monochromatic lights; and
    a digital micromirror device (DMD) panel for reflecting the monochromatic lights at a predetermined angle.

2. An image projection apparatus, comprising:
    a light source for irradiating a white light;
    a light quantity amplifying unit for amplifying a light quantity of a ray of the white light having a certain wavelength, and for outputting the amplified ray;
    a light separating unit for receiving the white light from the light quantity amplifying unit and for separating the received light into a plurality of monochromatic lights; and
    a digital micromirror device (DMD) panel for reflecting the monochromatic lights at a predetermined angle,
    wherein the light quantity amplifying unit is comprised of a fluorescent substance that transforms the white light into a light of the certain wavelength by letting the wavelength of the visible light band pass, while absorbing the other wavelengths.

3. The image projection apparatus of claim 2, wherein the light quantity amplifying unit moves an intermediate wavelength of the certain wavelength within a predetermined range.

4. The image projection apparatus of claim 1, wherein the light separating unit is comprised of a rotatable wheel that is divided into a red region, a green region and a blue region, for separating the white light into the plurality of monochromatic lights.

5. The image projection apparatus of claim 1, further comprising a square beam generating unit for transforming the plurality of monochromatic lights received from the light separating unit into a square beam.

6. An image projection method, comprising: irradiating a white light;
    transforming a light quantity of a ray of the white light within a non-visible band into a second light quantity within a visible band, combining the second light quantity with the white light and outputting the amplified white light;
    separating the amplified white light into a plurality of monochromatic lights; and
    reflecting the monochromatic lights at a predetermined angle.

7. An image projection method, comprising:
    irradiating a white light;
    amplifying a light quantity of a ray of the white light having a certain wavelength;
    separating the white light into a plurality of monochromatic lights; and
    reflecting the monochromatic lights at a predetermined angle,
    wherein the light quantity of a ray is amplified by a fluorescent substance that transforms the white light into a light of the certain wavelength by letting the wavelength of the visible light band pass, while absorbing the other wavelengths.

8. The image projection method of claim 7, further comprising moving an intermediate wavelength of the certain wavelength within a predetermined range.

9. The image projection method of claim 6, further comprising separating the white light into a plurality of monochromatic lights by a rotatable wheel that is divided into a red region, a green region, and a blue region.

10. The image projection method of claim 6, further comprising transforming the plurality of monochromatic lights into a square beam.

* * * * *